March 15, 1932.   L. B. BRIDGES   1,849,067
SUCKER ROD
Filed June 14, 1930
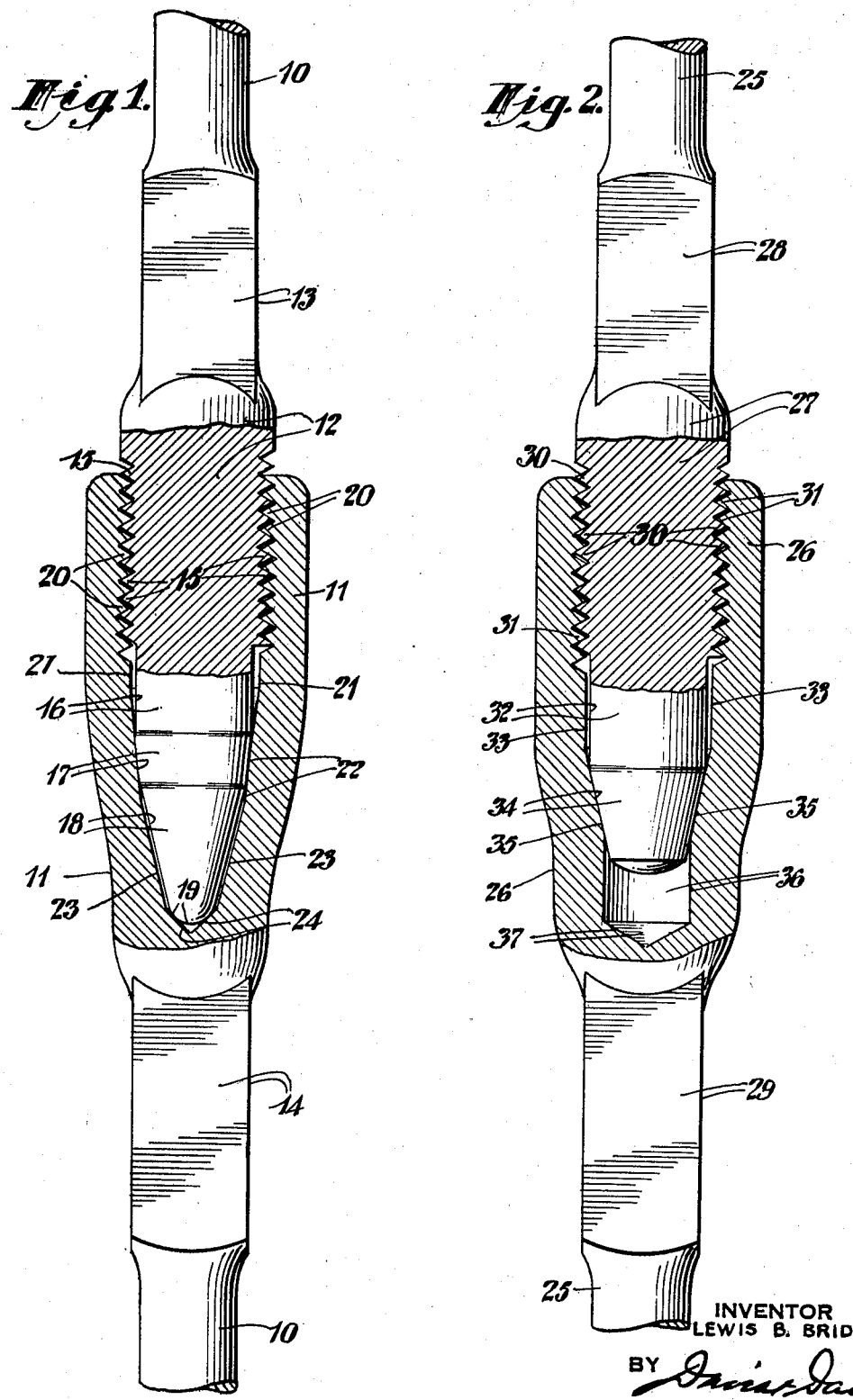
INVENTOR
LEWIS B. BRIDGES
BY
ATTORNEYS Patented Mar. 15, 1932

1,849,067

UNITED STATES PATENT OFFICE

LEWIS B. BRIDGES, OF MADISON, NEW JERSEY, ASSIGNOR TO DARDELET THREADLOCK CORPORATION, OF NEW YORK, N. Y., A CORPORATION OF DELAWARE

SUCKER ROD

Application filed June 14, 1930. Serial No. 461,085.

This invention relates to improvements in sucker rods and other rod-like articles comprising screw thread coupled sections.

The invention has for its principal objects to provide articles of the kind set forth the sections of which are so jointed as to eliminate or largely avoid breakage or fracture in the joints and accidental uncoupling of the jointed sections; to prevent cocking movements between the sections in the joints; to prevent belling out of the female portion of the joint with the resultant loss of efficiency of the thread connection; to maintain the tensile strength of the rod to a maximum degree when its sections are coupled; and to provide an efficient sucker rod wherein the usual collar abutting the box mouth is eliminated.

In the accompanying drawings:

Fig. 1 is a view, partly in longitudinal section, of a portion of a sucker rod embodying the invention; and Fig. 2 a similar view of a slightly modified form of sucker rod also embodying the invention.

Referring first to the rod construction illustrated in Fig. 1, the rod comprises identical metallic rod sections each having a main body portion 10 of circular profile in cross-section, a box 11 at its upper end, a pin 12 at its lower end, and two squared wrench-receiving portions 13 and 14 located respectively at the upper end of the pin and bottom of the box. It will be observed that the usual collar provided at the base or upper end of the pin in the standard forms of sucker rods heretofore used is omitted and that the rim of the box does not have the usual abutment with such a collar or with any portion of the uppermost one of the rod sections, the upper portion of the pin having a greater transverse dimension than the remainder of the rod section except the box end of the section.

The upper portion of the pin is non-tapering and formed with an external screw thread 15. Directly below said threaded portion the pin has a cylindrical non-threaded portion 16 of substantial length and of reduced diameter, preferably of a diameter slightly less than the root or minor diameter of thread 15, as shown. Below portion 16 the pin is tapered downward and inward for a short distance, preferably at an angle to the rod axis within the angle of friction of the rod material, to form a conoidal box-expanding and friction grip or clutch portion 17, and below said portion 17 the degree of taper is increased to form a conoidal terminal portion 18 of the pin preferably having a rounded point 19, as shown. Portion 18 is of substantial length as compared with the total pin length and length of the threaded portion of the pin, and the portion 17 is preferably located, as shown, about midway between the point of the pin and the lower end of the pin thread 15.

The upper portion of the bore of box 11 is non-tapering and formed with an internal screw thread 20 complementary to thread 15 of the pin and engaged with the latter thread substantially from end to end of the threads. The coupling threads 15 and 20 may be of any of the various known types, those shown being V-threads, and it being one object of the invention to provide a strong and tight-holding coupling for rod sections employing ordinary non-locking screw threads (and especially the more universally used V-thread and American standard thread) and to overcome serious difficulties incident to the use of such threads in joints heretofore known.

Directly below its threaded portion, the box bore has a cylindrical non-threaded portion 21 of such diameter as to receive pin portion 16 without contacting the said pin portion, said diameter preferably being the same as the crest or minor diameter of thread 20, as shown, to leave a slight radial clearance between portions 16 and 21. Directly below portion 21 the bore is tapered downward and inward at the same angle to the rod axis as pin portion 17, the angle shown being approximately six degrees, to form a friction grip or clutch portion 22 made slightly longer than clutch and expander portion 17 of the pin for forcible telescoping of portion 17 in portion 22 between the ends of the latter portion when the rod sections are in the fully coupled position illustrated.

The remaining or lower portion of the box bore is given an increased taper corresponding with that of the lower end portion 18 of the pin so as to form a conoidal bore portion 23 adapted to receive said pin portion without contacting the periphery of the same. The box bore terminates in a bottom wall 24 preferably of dished or conoidal form, as shown, against which the rounded point 19 of the pin is forcibly pressed when the parts of the rod are fully coupled.

The conoidal portions 17 and 22 are correlated to mate prior to engagement of the end thrust abutting parts 19 and 24 and while parts 19 and 24 are slightly separated, so that portion 17 may be forcibly rammed partly through portion 22 by the action of the coupling threads before the screwing in of the pin is arrested. Surfaces 17 and 22 may thus with certainty be caused to take a very tight friction grip on each other under elastic tension to securely lock the rod sections against accidental unscrewing. The subsequent abutment of portions 19 and 24 positively limits the extent of screwing together of the rod sections and the forcible ramming together of these axially abutted portions tends to compress the pin axially and prevent the ordinary stressing of the pin incident to the usual collar and box mouth abutment of the present standard rods which greatly reduces the tensile strength of the rods the upper ones of which are required to sustain the very heavy load of many hundred feet of rod in the well.

The forcible longitudinal movement of portion 17 in portion 22 also slightly expands the box at a point a substantial distance from the box bottom and from the engaged screw threads thus tending to contract the upper threaded portion of the box and counteracting the usual tendency of this portion of the box to bell out or expand both in coupling and in use and insuring maintenance of the maximum axial holding strength of the coupling threads. This neutralizing of the belling effect also is effective to reduce liability of cocking or lateral hinge action between the engaged threads, a frequent source of pin and box fracture. This cocking is further prevented by the cone engagement 17—22 which have a slope in the reverse direction and at a different angle to the axis from that of the two side faces of the threads that are pressed together when the parts are fully coupled and are remote from the engaged threads, so as to very effectively resist rocking of one thread upon the other.

The firmly abutted portions 19 and 24 cause the upper side of the pin thread to be pressed and held tightly against the under side of the box thread thus increasing the friction holding effect resisting unscrewing, affording another anchor point remote from the threads to resist cocking in the joint, and positively preventing side or axial play between the threads and between the rod sections.

Except as hereinafter pointed out the modified form of sucker rod is constructed, and its various portions function, as in the case of the rod of Fig. 1 above described. It comprises identical metallic rod sections, each having a main body portion 25, a box 26 at its upper end, a pin 27 at its lower end, and two squared wrench-receiving portions 28 and 29 located respectively at the upper end of the pin and bottom of the box, the usual collar at the upper end of the pin being omitted and the box mouth having no end abutment with any portion of the rod.

The upper portions of the pin and the box bore are non-tapering and are provided with complementary engaged screw-threads 30 and 31, directly below which are cylindrical non-tapered and non-threaded pin and box bore portions 32 and 33 of substantial length having a slight radial clearance therebetween. Directly below portions 32 and 33 the pin and box bore are correspondingly tapered downward and inward to afford conoidal friction clutch portions 34 and 35, the pin in the case of the rod of Fig. 2, however, terminating at the lower end of its friction clutch and box-expanding portion 34, while the box bore in this construction is provided with a cylindrical non-threaded lower portion 36 extending below the lower end of the pin a substantial distance in the fully coupled position of the rod sections shown and terminating in a dished or conoidal bottom wall 37.

In the construction of Fig. 2, as in the case of the rod of Fig. 1, it will be noted that the clutch and box expanding engagement is at a point a substantial distance from both the box bottom and the point of screw threaded engagement, so that, when the pin is screwed tightly home, it not only insures the tight friction grip between portions 34 and 35 and also between the under side of the box thread and upper side of the pin thread, but pin portion 34 is properly effective to expand the box at the point of engagement of portions 34 and 35 in such manner as to prevent the undesirable belling effect hereinbefore referred to.

In the Fig. 2 construction it will be noted that the bottoming of the pin against the box bottom is omitted, and that the angle of the cone surfaces 34 and 35 to the rod axis has been increased over that of the corresponding portions of the rod of Fig. 1. The increased angle (that shown being about fourteen degrees) affords a greater degree of expansion of the box at a point spaced from both ends of the box for a given amount of forcible telescoping of portions 34 and 35 and the increased axial resistance to screwing in movement of the pin soon becomes, in conjunction with the frictional resistance, sufficient to effectively limit in practice the screwing in or coupling movement. It will be noted that, both in Fig. 1 and Fig. 2, the exterior of the box has the same general conformation as the box bore, the box wall being of substantially the same thickness throughout, this feature being of advantage in connection with securing the proper expanding effect and the desired avoidance of the belling effect, and also, in connection with the remaining rod contour shown, contributing to reduction in oil resistance in pumping operations.

Both in Fig. 1 and Fig. 2 the box is shown slightly expanded over its normal size, the crest of the box thread being lifted from the root of the pin thread slightly, but it will be observed that owing to the mandrel action between the conoidal friction portions the engaged conoidal thread faces of the pin and box are squarely abutted and not canted relatively to each other, so that the resistance of the threads to the axial load or stripping stress is not impaired. The mutual support between the coupled sections in the described constructions is highly efficient to sustain the working stresses, and to resist relative cocking between the coupled end of the sections which would quickly break down the threads or fracture the pin. It will be obvious that in constructions such that by reason of the action between threads and/or cone or other portions of the coupled sections the mouth or threaded portion of the box is belled or flared or has a normal tendency to bell or flare in use, the freedom of the sections to cock is increased and the efficiency and life of the rod greatly impaired. By the present invention there is combined with a thread coupling a distinct cone friction locking means in such manner as to substantially eliminate breakage of the externally threaded portion of the joint and breaking down of the engaged threads.

What I claim is:

1. A sucker rod comprising two members one of which is provided at one end with a box into which the adjacent end of the other member is screwed and wedged, wherein said box has normally internally cylindrical end portions connected by a normally internally conoidal intermediate portion tapering toward the inner end of the box, the outer end portion only of the box being internally screw threaded, and said adjacent end of said other rod member has a non-tapered externally threaded part screwed in said threaded box portion and also has a threadless part wedged in and elastically expanding said intermediate internally conoidal box portion, the members being free from contact except for the screw thread connection therebetween and the wedged engagement of said leading threadless part of said adjacent member in said intermediate internally conoidal portion of said box.

2. A sucker rod comprising a rod member formed at one end with a pin box having a bore the outer end portion of which is internally threaded and non-tapered and the remaining portion of which is non-threaded, and a second rod member formed with a pin having a threadless leading portion followed by a non-tapered externally threaded portion which is screwed in the threaded outer end portion of the box, said threadless portions of the box and pin having wedging parts holding the box radially and elastically distended with the box out of contact with the pin at both ends of said wedging parts for a substantial distance in comparison with the length of the screw thread connection, and said rod members being mutually engaged solely through the medium of their screw-threads beyond the outer end of said wedging parts of said box and pin.

3. A sucker rod as claimed in claim 2, wherein said threadless leading portion of the pin terminates in a rounded tip, and the box bore terminates in a conoidal end wall abutted by said rounded tip, the box bore and threadless portion of the pin having coactive conoidal wedging surfaces tapering toward the inner end of the box and mutually engaged only in a zone located substantially midway between the inner end of the box and the inner end of the screw thread connection between the box and pin.

In testimony whereof I hereunto affix my signature.

LEWIS B. BRIDGES.